United States Patent [19]

Elliott et al.

[11] Patent Number: 4,611,890
[45] Date of Patent: Sep. 16, 1986

[54] REDOX CHROMOPHORE COMPOUNDS AND ELECTRODES OF METAL CONTAINING SUBSTITUTED BIPYRIDINES

[75] Inventors: Cecil M. Elliott; Jody G. Redepenning, both of Fort Collins, Colo.

[73] Assignee: Research Corporation, New York, N.Y.

[21] Appl. No.: 573,886

[22] Filed: Jan. 24, 1984

[51] Int. Cl.$^4$ .................. C08F 126/06; C08F 226/06; G03C 1/03; G02F 1/01
[52] U.S. Cl. ..................... 350/357; 526/265; 252/600; 427/108; 445/58
[58] Field of Search ............... 252/600, 408.1; 350/357; 526/265; 427/108; 445/58

[56] References Cited

U.S. PATENT DOCUMENTS

| | | | |
|---|---|---|---|
| 3,043,822 | 7/1962 | Maeder | 526/265 X |
| 3,178,397 | 4/1965 | Olaj | 526/265 X |
| 3,408,338 | 10/1968 | Szita | 526/265 X |
| 3,810,872 | 5/1974 | Chapurlat | 526/265 X |
| 4,192,581 | 3/1980 | Yaguchi | 252/600 X |
| 4,210,390 | 7/1980 | Yaguchi | 252/600 X |
| 4,376,569 | 3/1983 | Barltrop | 252/600 X |

FOREIGN PATENT DOCUMENTS

| | | | |
|---|---|---|---|
| 45276 | 7/1981 | European Pat. Off. | |
| 57-57778 | 4/1982 | Japan | 252/600 |
| 57-157069 | 9/1983 | Japan | 252/600 |

OTHER PUBLICATIONS

"Conductive Polymers Undergo Color Changes", Jun. 13, 1983, Chemical and Engineering News.
Kurita, et al., "Heat Resistant Polymers Containing Bipyridyl Units", J. Polym. Sci., Pol. Chem. Ed., vol. 11, 3151–3160 (1973).
"Synthesis & Investigation . . . ", Gershuns, Ukr. Khim. Zh. (Russian Ed.), 32(12), 1311–1314, 1966.
Miller, et al., "Complex Formation . . . ", J. Chem. Soc., Dalton Trans., 1511–1514, 1983.
"Prep. of Poly(Vinyl-2,2' Bipyridine) and Complex", J. of Polymer Science, Poly. Lett. Ed., vol. 20, 291–295, 1982.
Edwards, et al., "Complexes of Copper Acetate", J. Chem. Soc., Dalton, 637–643, 1975.
Kabanov, et al., "Polypropargyl Pyridinium and Complex", J. Appl. Poly. Sci., vol. 19, pp. 1275–1281 (1975).
Kurita, et al., "Soluble Polyimides from Bipyridyl Diamines", Plast. Chem. PAP, 33(1), 177–183, 1973.
Kumar, et al., "Chelating Copolymers . . . ", Macromolecules, 17, 2463–2467, 1984.
Kelly, et al., "Some Bis(2,2'-Bipyridyl)Ruthenium (II) and Tetracarbonyl Tungsten Complexes", Inorg. Chem. 22, 2818–2824, 1983.
Guadalupe et al., "Electroanalysis with Chemically Modified Electrodes", Anal. Chem. 57, 142–149, 1985.

*Primary Examiner*—John F. Terapane
*Assistant Examiner*—Catherine S. Kilby
*Attorney, Agent, or Firm*—Scully, Scott, Murphy & Presser

[57] ABSTRACT

Chromophoric compounds, each having a wide range of distinct color changes in response to changes in the oxidation states thereof, are provided in the form of polymerizable monomers, and polymers thereof, of certain metal containing, and electron group substituted, 2,2'-bipyridine compounds.

38 Claims, No Drawings

REDOX CHROMOPHORE COMPOUNDS AND ELECTRODES OF METAL CONTAINING SUBSTITUTED BIPYRIDINES

The invention described herein was made in the course of work under a grant or award sponsored, at least in part, by the United States Department of Energy, Division of Basic Sciences.

Field of the Invention

This invention relates to the field of chromogenic materials in the form of electrochromic materials, i.e., materials in which a color change is induced by the application of a voltage thereto with the subsequent passage of electric current, and to the use of such electrochemical materials in electronic display devices.

Description of the Prior Art

Solid and liquid electrochromic materials are known. The solid electrochromic materials are much easier to use than the liquid materials in the various types of commercial devices, such as electronic display devices, in which an electrochromic material may be employable.

Some solid inorganic electrochemical materials such as transition metal oxides such as $WO_3$, $V_2O_5$ and various silver compounds (U.S. Pat. No. 3,995,943) which have been available to date provide a relatively limited range of distinct color changes in response to electrical charges applied thereto that might be used as a basis for designing electronic display devices employing such electrochemical materials.

Redox chromophores of a solid or liquid nature are known, including various non-metal containing substituted 2,2' bipyridine compounds, which can provide for some, but a limited, range in the color spectrum that can be readily obtained by applying changes in voltage to such materials (U.S. Pat. No. 4,309,082; and Kirk and Othmer, Encyclopedia of Chemical Technology, 3rd Ed., 1979, Vol. 6, Page 129). Redox phthalocyanine compounds substituted with lutetium may be used as chromophores to provide three color changes; F. A. Pizzarello and M. M. Nicholson, J. Electrochem. Soc., 128, (1981), pages 1288–1290; M. M. Nicholson and F. A. Pizzarello, J. Electrochem. Soc., 128, (1981), pages 1740–1743.

In order to attempt to produce redox type chromophores which could, individually, provide a relatively wide range of color changes several ring substituted bipyridine complexes of ruthenium have been prepared. (C. M. Elliott, J. C. S. Chem Comm., 1980, Pages 261, 262, and C. M. Elliott and E. J. Hershenhart, J. Amer. Chem. Soc, 1982, Vol. 104, NO. 26, Pages 7519–7526). These complexes were formed as tris complexes, with ruthenium (II), of 2,2'-pyridine substituted in the 4,4' or 5,5' positions with electron withdrawing groups such as ethyl ester groups. It has been found that these complexes could exist in at least seven, discrete, stable oxidation states under room temperature conditions and when employed in solvents such as dimethylformamide. They must be stored or used, however, in the absence of oxygen and water.

Although both the 4,4' and the 5,5' substituted bipyridine ruthenium II complexes previously prepared, as disclosed above, have very similar electrochemical behavior, they are very different in their spectral properties which represent very different observable color change characteristics when they are subjected to changes in voltages and the subsequent passing of an electric current therethrough. Thus, for example, although solutions of both the 4,4' and 5,5' carboxyethyl-2,2'-bipyridine tris complexes of ruthenium (II) are red-orange when the valence state of the complex is at plus two (2+), successive stages in the reduction of the substituted ligands in the 4,4'-carboxyethyl substituted complex produce solutions which, progressively, become darker grey-brown in color. In contrast, successive stages in the reduction of solutions of the tris(5,5'-carboxyethyl-2,2'-bipyridine) ruthenium II complex produce brightly colored solutions having, as shown in Table I below, the following array of colors at the indicated oxidation state of the complex, which oxidation state is created at the range of voltage or potential applied thereto:

TABLE I

Electrochromic Properties of tris (5,5'-dicarboxyethyl-2,2'-bipyridine) Ru II*

| Oxidation State | Potenial Range | Solution* Color |
| --- | --- | --- |
| +2 | +1.53 to −0.66 | orange |
| +1 | −0.66 to −0.75 | purple |
| 0 | −0.75 to −0.91 | blue |
| −1 | −0.91 to −1.37 | green-blue |
| −2 | −1.37 to −1.57 | brown |
| −3 | −1.57 to −1.82 | rust |
| −4 | −1.82 to −2.5 | cherry red |

*as a $1.0 \times 10^{-3}$ molar solution in dimethylformamide, 0.10 molar tetra-n-butylammonium hexafluorophosphate.
vs. saturated calomel reference electrode Although this range of color changes could be obtained with these ruthenium complexes, the utility of these complexes in electrooptical devices is very limited because, in order to obtain the benefit of such color change phenomena, it is necessary to use these complexes in solution form, and in non-aqueous solvents such as dimethylformamide. Because of the design limitations that would be imposed by the use of these complexes in solution, it is not possible to readily use such complexes as chromophores in all of the various types of electrochemical display devices which are being commercialized today.

SUMMARY OF THE PRESENT INVENTION

An object of the present invention is to provide chromophoric materials having a wide range of distinct color change characteristics and which can be readily used as such in a wide variety of electronic display devices.

A further object of the present invention is to provide redox chromophoric materials in solid form having a wide range of color change characteristics.

A further object of the present invention is to provide a means for transforming, into a significantly more useful solid form, various metal complexes of 2,2' bipyridine compounds which are only useful, as such, as chromophores in solution form, without incurring any significant loss of such chromophoric properties.

A further object of the present invention is to provide a new class of solid, polymeric, metal complexed 2,2' bipyridine compounds which are useful as chromophores, and a new class of metal containing polymerizable monomers from which such polymers may be formed, and a new class of non-metal containing intermediate compounds from which such metal containing monomers may be prepared.

Another object of the present invention is to provide electronic display devices which are equipped with, as the chromophoric element therein, a novel class of polymeric chromophores having a wide range of distinct color spectra.

These and other objects of the present invention are achieved, in accordance with the present invention, by transforming, by a novel reaction scheme as described below, certain non-polymerizable chromophoric 2,2'-bipyridine tris complexes of metals such as ruthenium which are substituted with electron withdrawing groups which provide such chromophoric complexes with a wide spectrum of color change properties into polymerizable monomers without significantly changing the electron withdrawing capabilities of the substituents in such complexes, and by then polymerizing the polymerizable monomeric complexes into solid chromophoric materials which retain essentially the same wide range of chromophoric properties of the non-polymerizable monomeric chromophores.

DESCRIPTION OF THE PREFERRED EMBODIMENT

The preferred monomeric, polymerizable 2,2'-bipyridyl metal complexes employed in making the polymers of the present invention have the following structures:

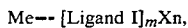   I or

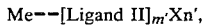   II wherein Ligands I and II are respectively, 4,4' and 5,5' substituted 2,2'-bipyridyl groups of the structure:

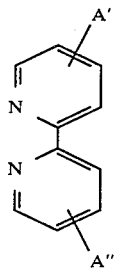   III wherein A' and A" are the same or different and have the structure

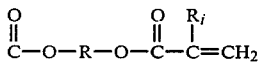

wherein R is a $C_2$ to $C_{18}$, and preferably $C_2$ to $C_8$, hydrocarbon radical such as ethyl, propyl, butyl, pentyl, hexyl, heptyl, and octyl, $R_i$ is H or $CH_3$, and the R and $R_i$ radicals in the A and A' radicals in the same ligand may be the same or different, Me is chromium or a metal of Group VIII of the Mendeleef Periodic Table of the elements, i.e., iron, cobalt, nickel, ruthenium, rhenium, palladium, osmium, iridium and platinum. The preferred of these metals for use in the complexes and polymers of the present invention are ruthenium, iron, cobalt and nickel, with ruthenium being the most preferred.

The metals used in these I and II complexes are, preferably, used in the following oxidation states: $Cr^{+2 or 3}$, $Fe^{+2}$, $Co^{+1 or 2}$, $Ni^{+2}$, $Ru^{+2}$, $Rh^{+1 or 2}$, $Pd^{+2}$, $Os^{+2}$, $Ir^{+1 or 2}$, and $Pt+2$.

m and m' are each integers of 1 to 3, and are determined by the identity and oxidation state of Me, and are equal to one half of the coordination number of Me.

Where Me is Ruthenium, m or m' is preferably 3.

X is an anion which is incidental to the formation of the complexes and represents the salt or complex form in which the metal Me was introduced into the bipyridine complexes as disclosed below, or the anion is used to render the complexes less soluble for purposes of isolation, or to lower the melting point of the monomer. The preferred compatible anions are: $Cl^-$, $Br^-$, $I^-$, $F^-$, $SO_4^-$, $CO_3^-$, $ClO_4^-$, p-toluene sulfonate$^-$, $PF_6^-$, $NO_3^-$ and $C_2H_3O_2^-$.

The most preferred of such anions are the chlorides.

n and n' are each integers of 1 to 3 and are determined by the oxidation state of Me.

The most preferred of these complexes have the following structures:

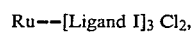   IV or

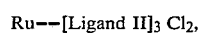   V

The most preferred of these complexes are those of structure V and particularly those in which R is propyl and $R_i$ is H.

A preferred procedure for making these preferred ruthenium containing complexes is disclosed below in Example I.

A broader description of the polymerizable complexes of the present invention is that as disclosed in the following structure:

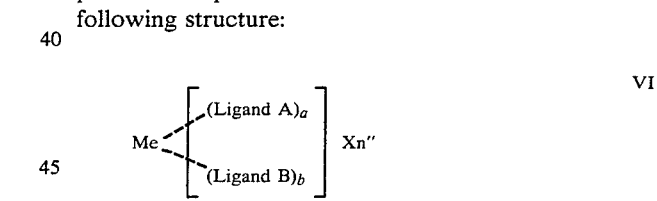   VI wherein Me is as described above, and X is an anion as described above.

Ligand A is a Ligand I or II as described above, and

Ligand B is a Ligand A, or an unsubstituted 2,2'-bipyridyl radical, or a 2,2' bipyridyl radical substituted with only one or more hydrocarbon radicals such as $C_1$ to $C_8$ aliphatic and aromatic radicals, or is a Ligand I or II, but different than Ligand A.

n" is an integer which is 1 to 3 and is determined by the valence of Me.

a and b are integers, a is 1, 2, or 3, b is 0, 1 or 2, and $a+b=1$, 2, or 3, and the sum of a+b corresponds to one half the coordination number of Me.

The preferred of the structure VI complexes are those in which 2 to 3 of the Ligand A's are those of structure III, as shown above.

The polymerizable complexes of the present invention may also be prepared by reacting an acryloyl or methacryloyl halide with a complex of the structure

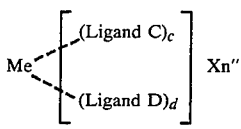

(VII)

wherein Me, X and n″ are as defined above for structure VI,

Ligand C is either a 4,4′ or a 5,5′ substituted 2,2′ bipyridyl group of the structure

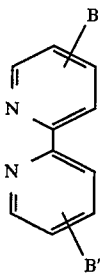

(VIII)

wherein B′ is a radical of the structure

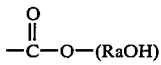

wherein (RaOH) is a terminal hydroxy $C_2$ to $C_{18}$ radical, and the (RaOH) radicals in each Ligand C may be the same or different.

Ligand D is an unsubstituted 2,2′ bipyridyl radical, or a 2,2′ bipyridyl radical substituted with hydrocarbon radicals such as $C_2$ to $C_{18}$ aliphatic and aromatic hydrocarbon radicals.

c and d are integers, c is 1, 2, or 3, d is 0, 1 or 2 and c+d=1, 2 or 3, and c+d corresponds to one half of the coordination number of Me.

The acryloyl and methacryloyl halides that may be used with the Structure VII compounds to form the polymerizable monomers of the present invention have the structure

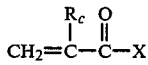

(IX)

wherein $R_c$ is H when such compound is an acryloyl halide, or is $CH_3$ when such compound is a methacryloyl halide, and X is Cl, Br, F or I.

The reaction between the structure VII compound and the structure IX compound is conducted in an aprotic organic solvent such as acetonitrile. This reaction is conducted at the reflux temperature of the solvent, which in the case of acetontrile is about 82° C., for about 10 to 30 minutes using an excess of the structure IX compound or approximately stoichiometric ratios of the reactants. The resulting structure VI compounds need not be isolated from the reaction solvent in which they are prepared prior to making polymers therefrom.

The structure VI compounds can be recovered, however, and used as such, as chromophore materials having the same, or different, ranges of color change characteristics as shown in Table I above for tris(5,5′-dicarboxyethyl-2,2′-bipyridine) Ru II. The monomeric, polymerizable, structure VI compounds can be used to a limited degree, as chromopores, in electronic display devices that can be designed around the use of such materials as chromophores in solution form in liquid cells.

The structure VI polymerizable compounds are, however, preferably used, in accordance with the present invention, to form solid polymers, of relatively high molecular weight, which possess chromophoric qualities comparable to those of the non-polymerizable and polymerizable monomeric precursor compounds discussed above.

The availability of these solid, polymeric, chromophores greatly facilitates the design of electronic display devices intended to obtain the benefit of the use of a single chromophore therein to provide the unusually wide range of color change characteristics as are provided by the monomers and polymers of the present invention.

The polymers are prepared by preparing, or dissolving, the polymerizable monomers of structure VI in an aprotic solvent such as acetonitrile, and by first rapidly evaporating the solvent from such solution in air and at a temperature of about 25±5° C., to produce a slightly tacky, glassy film of the monomer and by then heating the film at a temperature of about 150±25° C. for at least 12, and preferably, about 14 to 16 hours. No catalyst is needed for this thermal polymerization reaction. The resulting film is insoluble, at 25±5° C., in solvents such as water, benzene, acetonitrile, dimethylformamide, dimethyl sulfoxide and methylene chloride.

The polymer slowly decomposes in concentrated $H_2SO_4$.

Polymerization for periods of time longer than about 20 hours and/or at temperatures above about 180° C. tends to produce polymers having resistance values of (when fully swollen in dimethylsulfoxide) ≦500 ohm-$cm^2$ which render their current and potential characteristics poor. It is preferable, therefore, to so regulate the time and temperature of polymerization, which will vary with each species of polymerizable monomer being used, so as to produce polymers having resistance values (when fully swollen in dimethylsulfoxide) in the range of about 50 to 150 ohm-$cm^2$.

The polymer, it is believed, polymerizes in short linear chains through pendant double bonds provided by the acryloyl or methacryloyl groups of the Structure IX compounds. The polymer, it is also believed, is crosslinked through the Me radicals therein.

The polymer is preferably used, as such, as a chromophore by being deposited in films of about 1 to 5 microns thickness on an electrode such as tin oxide.

When the polymer coated electrode is placed in a standard electrochemical cell, and the system is allowed to achieve steady state conditions, changing the potential of the system by cycling in the range of between about 0.0 and −1.8 volts vs. saturated calomel reference electrode will produce a wide range of distinct color changes at different potentials within the defined range. Although a given species of polymer or polymerizable monomer of the present invention may be capable of providing, as a chromophore, up to seven or more distinct color changes over a given range of potentials, it is possible to so select the range of potentials being used in this regard as to use less than the full complement of color changes available from such chromophore, and to only use, for example 4, or 5, or 6 of such color changes.

The addition of one or more other polymerizable vinyl monomers to the polymerizable monomer complex before the latter is polymerized may be used to extend the lifetime of the polymeric films on the electrodes while not inhibiting the electrochemical activity of the films, by forming copolymer film of one or more of the Structure VI compounds with one or more of the copolymerizable compounds. Copolymers may also be prepared from two or more different Structure VI compounds. Such other copolymerizable compounds would include those having the structures

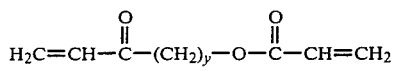   X and

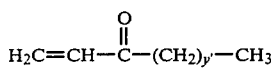   XI wherein y and y' may be the same or different and are integers and y is 2 to 32 and y' is 0 to 32

The following examples are merely illustrative of the present invention and are not intended as a limitation upon the scope thereof.

EXAMPLE 1

Preparation of Ruthenium Complex of Structure V

1. Preparation of non-metal containing, unsaturated complex

Step I

Thionyl Chloride (50 ml.) and 5,5'dicarboxy-2,2'bipyridine (2.96 grams) are refluxed for about five hours. The remaining thionyl chloride is then rotoevaporated off to produce an acyl chloride compound of the structure

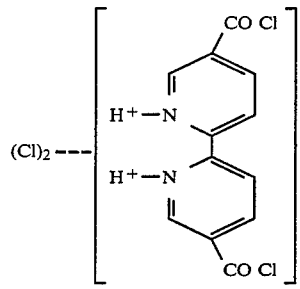   XII 1,3 Propanediol (25 ml.) is then added to the flask containing the acyl chloride of structure XII, and the system is then heated at 100° C. for about 30 minutes under nitrogen. The resulting solution is cooled and stored under nitrogen overnight. The solution was essentially a solution of a compound having the following structure

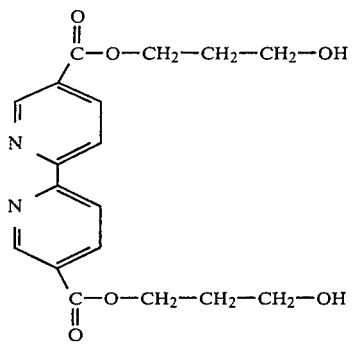   XIII

The stored solution is then added slowly, over a period of about 30 minutes, to 175 ml. of a 5% by volume solution of triethylamine in acetonitrile to form a solid which precipitates out and which has structure (XIII).

Step II

The solid compound of structure XIII is filtered off and washed three times with 25 ml. aliquots of a 5% solution, by volume, of triethylamine in acetonitrile. The system is dried to remove the solvent therefrom to provide a yield of about 61% of a compound of the Structure XIII.

Step III

The compound of structure XIII (0.1 grams) is then suspended in 25 ml. of acetonitrile and acryloyl chloride (1 ml.) is added thereto and the system is stirred overnight, under nitrogen, and at about 25° C. The resulting solution is then rotoevaporated to dryness at room temperature. A mixture of 50 ml. of benzene and 2 ml. of pyridine are added to dissolve the solid and this solution is then extracted with distilled water, and the remaining organic layer is filtered and rotoevaporated to dryness.

The remaining solid is redissolved in acetonitrile, and distilled water is added until the system becomes cloudy with a precipitate. More acetonitrile is then added to redissolve the precipitate and the acetonitrile is then rotoevaporated off at room temperature to yield a solid product suspended in water which is then recovered by filtration. The solid product is essentially a compound of the structure

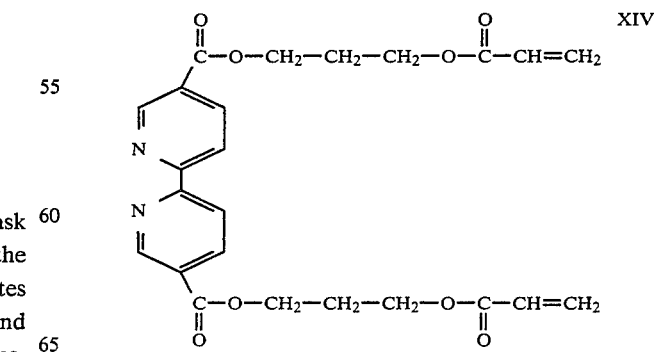   XIV

This product may contain some impurities such as in the form of compounds of the structure

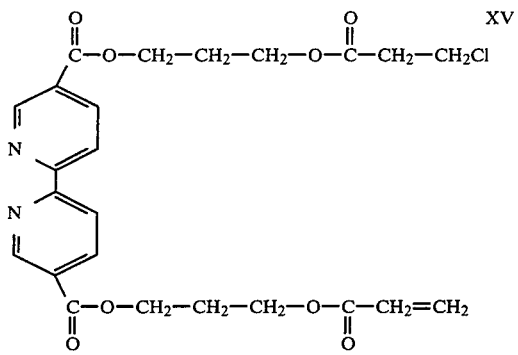

XV

These impurities, however, are of such a nature and are present, if at all, in such small quantities, as to not present any significant problems with respect to the subsequent use of the structure XIV compounds, in accordance with their utility with respect to the present invention. Therefore, there is no practical need to attempt to remove these impurities from the solutions of the structure XIV compounds.

2. Preparation of $Ru^{+2}$ salt of Structure XIV Compound

A mixture of 1,3 propanediol (10 ml.) and Ru (dimethyl sulfoxide)$_4$ Cl$_2$ (0.10 grams) were slowly brought to reflux under nitrogen over a period of about 10 minutes and then cooled to room temperature to produce a solution of a ruthenium II complex the structure of which is not exactly known but wherein it is believed one or more dimethyl sulfoxide groups in the sulfoxide reagent are replaced with 1,3-propanediol. Ths use of this intermediate reagent with the Structure XIV compound appears to provide a more direct route to the desired Structure XVI compound, than by using an unmodified ruthenium containing sulfoxide reagent.

A 25% stoichrometric excess of the compound of structure XIV (0.30 grams) is then added to the ruthenium complex solution and the system is heated at 120° C. for 20 minutes to produce a complex of the structure

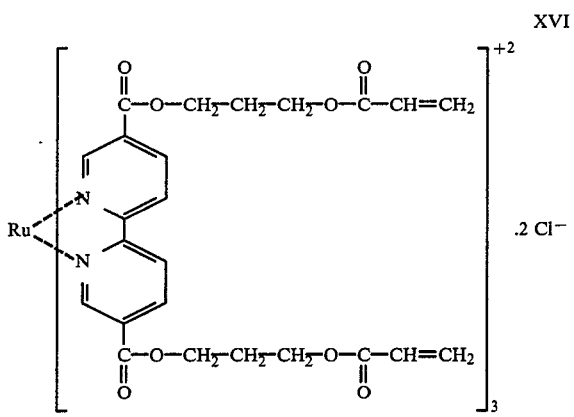

XVI

The compound of structure XVI is recovered by rotoevaporating the solvent therefrom and dissolving the compound in distilled water. The compound of structure XVI is purified by chromatography on silica gel eluting wth 50% (v/v) acetonitrile in water solution saturated with KNO$_3$. The compound of structure XVI is identified as such by visible spectroscopy and NMR spectroscopy.

The structure XVI compound is precipitated as the $PF_6^-$ salt thereof by the addition of NH$_4$PF$_6$ to the above solution after the removal of the acetonitrile therefrom by evaporation. The $PF_6^-$ salt precipitate is then filtered and dried to yield a product of the structure

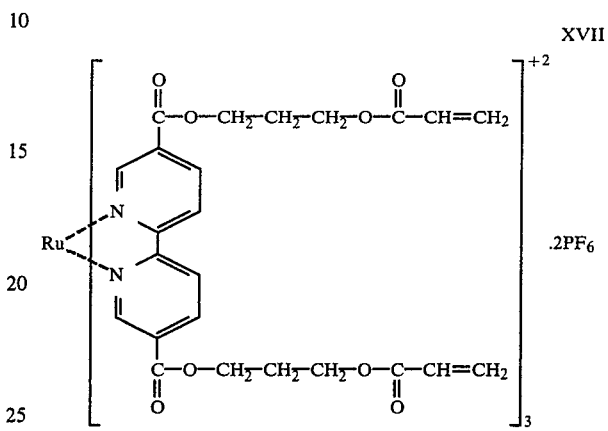

XVII

3. Polymer Formation

The polymerizable monomer of structure XVII or XVI is dissolved in acetonitrile within the range of $5.0 \times 10^{-2}$ to $5.0 \times 10^{-4}$ Molar solution) and the solvent is then evaporated quickly over a period of 5 minutes at $25 \pm 5°$ C. in air at atmospheric pressure. The resulting product does not crystallize but forms a somewhat tacky-feeling glassy film. This film is then heated at 150° C. for about 15 hours in air to produce a polymeric film that is insoluble, at 20° to 30° C., in the following solvents: methylene chloride, dimethylsulfoxide, dimethylformamide, water, benzene and acetonitrile.

The film is slowly decomposed, over a period of about one hour, in concentrated H$_2$SO$_4$. The polymer is red-orange in color.

The polymer is used to provide a one to five micron thick coating on a SnO$_2$ electrode and the polymer coated electrode is placed in a standard electrochemical cell employing a 0.10 molar solution of tetra-n-butyl ammonium hexafluorophosphate (TBA$^+$PF$_6^-$) in either dimethylformamide or dimethylsulfoxide as the electrolyte. When the potential of the system is initially cycled between 0.00 V and $-2.0$ V versus a saturated calomel electrode, no current is passed, at first, because of the resistivity of the film. With continued potential cycling, however, over a period of about 15 minutes, small islands in the polymer began to darken to a blue-grey color, and, at the same time, the current flow began to rise. Both the islands of color and the current continue to grow over several minutes until a steady state current is attained. Starting at 0.0 V the polymer coating is identical to that observed in air, i.e., it exhibits the same orange-red color characteristic of the 2+ oxidation state of the complex of structure XVI. As the potential is swept in the negative direction, however, the oxidation state of the complex in the polymer changes and its color changes sequentially through a fairly accurate reproduction of the colors exhibited by the tris-5,5'-dicarboxy-ethyl-2,2'-bipyridine complex in solution as shown in Table I above. The polymer is formed on the electrode by polymerizing a film of the monomer thereon.

EXAMPLE 2

Acryloyl chloride (2 grams) and the dichloride salt of ruthenium tris-(5,5'dicarboxy-gammahydroxy propyl ester-2,2'bipyridine) (1 gram) were dissolved in 25 ml. of acetonitrile and heated at 80° C. for 10 minutes. The resulting polymerizable monomeric product had the Structure II as shown above, wherein Me is Ru, X is Cl, n' is 2, m' is 3, R is propyl and $R_i$ is H. The compound of Structure II is identified as such by visible spectroscopy and by NMR spectroscopy.

The polymerizable monomer within the range of $5.0 \times 10^{-2}$ to $5.0 \times 10^{-4}$ Molar) was retained in the acetonitrile solvent in which it was prepared and the solvent was evaporated quickly over a period of 5 minutes at 25° C. at atmospheric pressure in air. The resulting product did not appear to crystallize but formed a somewhat tacky-feeling glassy film. This film was then heated at 160° C. for about 12 hours in air to produce a polymeric film that was insoluble, at 25° to 30° C., in the following solvents: methylene chloride, dimethyl sulfoxide, dimethylformamide, water, benzene and acetonitrile. The film was slowly decomposed, over a period of about one hour in concentrated H2SO4. The polymer was red-orange in color.

The polymer was then used to provide a 1 to 5 micron coating on a SnO2 electrode and the polymer coated electrode was placed in a standard electrochemical cell employing a 0.1 Molar solution of TBAPF6 in either dimethylformamide or dimethylsulfoxide as the electrolyte. When the potential of the system was initially cycled between 0.0 V and −2.0 V versus a saturated calomel electrode, no current was passed, at first, because of the resistivity of the film. With continued potential cycling, however, over a period of about 15 minutes, small islands in the polymer began to darken to blue-grey color, and, at the same time, the current flow began to rise. Both the islands of color and the current continue to grow over several minutes until a steady state current was attained. At this point, the entire polymer coating is conductive. Starting at 0.0 V the polymer coating is identical to that observed in air, i.e., it exhibits the same orange-red color characteristic of the 2+ oxidation state of the complex of structure XVI. As the potential is swept in the negative direction, however, the oxidation state of the complex in the polymer changes and its color changes sequentially through a fairly accurate reproduction of the colors exhibited by the tris-5,5'-dicarboxy-ethyl-2,2'-bipyridine complex in solution as shown in Table I above. The polymer is formed on the electrode by depositing a film of the monomer on the electrode and then thermally polymerizing the monomer thereon.

It is believed that the 5,5' substituted-2,2'-bipyridyl compounds of the type disclosed in structure XIV above are also novel compounds and are within the scope of the compounds of the present invention. The specific 5,5' substituted compounds of structure XIV above are species of compounds of the more generic structure

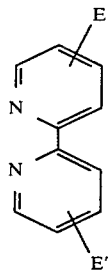

XVIII

Which represent 4,4' and 5,5' substituted 2,2'-bipyridyl compounds, wherein E and E' in each compound may be the same or different radicals of the structure

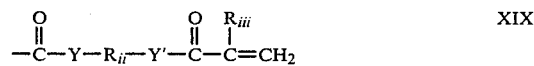

XIX wherein $R_{ii}$ is a $C_1$ to $C_{18}$ alkyl radical and $R_{iii}$ is H or CH3, and Y and Y' are either —O— or

Y and Y' may be the same or different $R_{iv}$ is either H or a $C_1$ to $C_8$ alkyl radical.

The 4,4' substituted compounds of structure XVIII may be prepared as otherwise disclosed in Example 1 above by using, in Step I of Example I, 4,4' substituted acyl halides in place of the 5,5' substituted acyl halide to obtain 4,4' substituted compounds and/or by using alpha, omega diols other than 1,3 propane diol in such Step I to make compounds wherein Y and Y' are —O—, and/or by using, alpha, omega diamines to make compounds wherein Y and Y' are

and/or by using meth(acryloyl)halides other than acryloyl chloride in Step III, of such Example 1. The glycols or amines that may be used in such Step I would thus have the structure

XX wherein $R_{ii}$ is as defined above and Z is OH or $HNR_{iv}$ and $R_{ii}$ is defined as above.

The (meth)acryloyl halide that may be used in Step III of Example 1 would thus have the structure

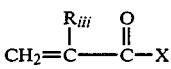

XXI wherein $R_{iii}$ is as defined above and X is Cl, Br, F or I.

The complexes which are prepared in the form of salts such as those shown in Structures XVI and XVII may be transformed into other salts by anionic ion exchange processes. Thus sulfonates could be obtained by the use of an ion exchange resin in the p-toluene sulfonate form by passing a solution of a Structure XVI or XVII compound down a column of such form of ion exchange resin.

The 4,4' substituted compound of structure XVIII can be used as otherwise disclosed in steps II and III of Example 1 to prepare ruthenium containing monomers and polymers analagous to the 5,5' substituted compounds prepared in such steps.

The compounds of structure XVIII can also be used, as otherwise disclosed in Example 1, to prepare complexes of the metals Me, as defined above, other than ruthenium.

The compounds of structure XVIII can also be used to form film forming polymers from one or more of such compounds alone, or with one or more other vinyl compounds, other than those described above.

What is claimed is:

1. A polymer consisting of at least one compound having the structure

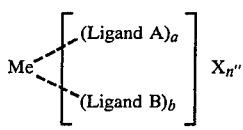

wherein Me is chromium or a Group VIII metal,
Ligand A is 4,4' or 5,5' substituted 2,2'bipyridyl group of the structure

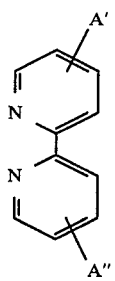

wherein A' and A" are the same or different in each Ligand A and have the structure

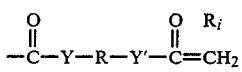

wherein R is $C_2$ to $C_{18}$ alkyl and $R_i$ is H or $CH_3$, Y and Y' are the same or different and are —O— or

and $R_{iv}$ is a $C_1$ to $C_8$ alkyl radical, and
Ligand B is an unsubstituted 2,2'-dipyridyl radical, a 2,2'-dipyridyl radical substituted with only one or more hydrocarbon radicals, or is a 4,4' or a 5,5' substituted 2,2' bipyridyl group of the structure shown above which is the same or different from that of Ligand A,
X is a compatible anion,
a and b are integers, a is 1, 2, or 3, b is 0, 1 or 2 and $a+b=1$, 2, or 3, and
n" is an integer which is 1, 2 or 3.

2. A polymer as in claim 1 wherein Me is selected from the group consisting of ruthenium, iron, cobalt and nickel.

3. A polymer as in claim 2 in which Me is ruthenium.

4. A polymer as in claim 2 wherein b is 0.

5. A polymer as in claim 4 in which Ligand A is a 5,5' substituted-2,2'-bipyridyl group.

6. A polymer as in claim 5 in which $R_i$ is H.

7. A polymer as in claim 6 in which R is propyl.

8. An electrode coated with a chromophorically useful layer of a polymer of claim 1.

9. An electrode coated with a chromophorically useful layer of a polymer of claim 3.

10. An electrode coated with a chromophorically useful layer of a polymer of claim 7.

11. In an electronic display device comprising at least one solid chromophore on an electrode, the improvement comprising employing as said electrode that of claim 8.

12. In an electronic display device comprising at least one solid chromophore on an electrode, the improvement comprising employing as said electrode that of claim 9.

13. In an electronic display device comprising at least one solid chromophore on an electrode, the improvement comprising employing as said electrode that of claim 10.

14. An electrode as in claim 8 in which said layer is about 1 to 5 microns thick.

15. An electrode as in claim 14 which is tin oxide.

16. A copolymer of at least one compound of Structure I and at least one compound of Structure II wherein said Structure I compound has the structure

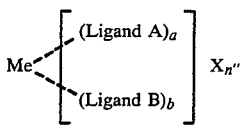

wherein Me is chromium or a Group VIII metal,
Ligand A is a 4,4' or 5,5' substituted 2,2' bipyridyl group of the Structure IA

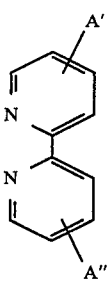

wherein A' and A" are the same or different in each Ligand A and have the Structure IB

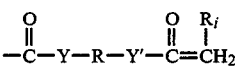

wherein R is $C_2$ to $C_{18}$ alkyl and $R_i$ is H or $CH_3$, Y and Y' are the same or different and are —O— or

and $R_{ir}$ is a $C_1$ to $C_8$ alkyl radical, and

Ligand B is an unsubstituted 2,2'-dipyridyl radical, a 2,2'-dipyridyl radical substituted with only one or more hydrocarbon radicals, or is a 4,4' or a 5,5' substituted 2,2' bipyridyl group of said Structure IA which is the same as, or different from, that of Ligand A, X is a compatible anion, a and b are integers, a is 1, 2, or 3, b is 0, 1 or 2 and $a+b = 1, 2$, or 3, and n" is an integer which is 1, 2 or 3, and said Structure II compound has at least one of the Structures IIA and IIB which are the structures

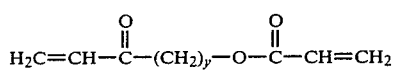

and

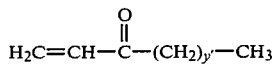

wherein y and y' are integers which may be the same or different and y is 2 to 32 and y' is 0 to 32.

17. A copolymer as in claim 16 wherein Me is ruthenium.

18. A copolymer as in claim 17 wherein b is 0.

19. A copolymer as in claim 18 wherein Ligand A is a 5,5' substituted-2,2'-bipyridyl group.

20. A copolymer as in claim 19 wherein $R_i$ is H.

21. A copolymer as in claim 20 wherein R is propyl.

22. A copolymer as in claim 16 formed from at least one compound of Structure I and at least one compound of Structure IIA.

23. A copolymer as in claim 16 formed from at least one compound of Structure I and at least one compound of Structure IIB.

24. A polymer formed from a monomer charge comprising at least one compound having the Structure III

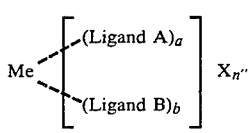

wherein Me is chromium or a Group VIII metal,

Ligand A is a 4,4' or 5,5' substituted 2,2'bipyridyl group of the Structure IIIA

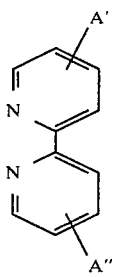

wherein A' is A" are the same or different in each Ligand A and have the Structure IIIB

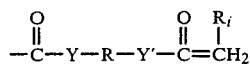

wherein R is $C_2$ to $C_{18}$ alkyl and $R_i$ is H or $CH_3$, Y and Y' are the same or different and are —O— or

and $R_{iv}$ is a $C_1$ to $C_8$ alkyl radical, and

Ligand B is an unsubstituted 2,2'-dipyridyl radical, a 2,2'-dipyridyl radical substituted with only one or more hydrocarbon radicals, or is a 4,4' or 5,5' substituted 2,2' bipyridyl group of said Structure IIIA which is the same as, or different from, that of Ligand A, X is a compatible anion, a and b are integers, a is 1, 2, or 3, b is 0, 1 or 2 and $a+b=1, 2$, or 3, and n" is an integer which is 1, 2 or 3.

25. A polymer as in claim 24 wherein Me is selected from the group consisting of ruthenium, iron, cobalt and nickel.

26. A polymer as in claim 25 in which Me is ruthenium.

27. A polymer as in claim 26 wherein b is 0.

28. A polymer as in claim 27 in which Ligand A is a 5,5' substituted 2,2'-bipyridyl group.

29. A polymer as in claim 28 in which $R_i$ is H.

30. A polymer as in claim 29 in which R is propyl.

31. An electrode coated with a chromophorically useful layer of a polymer of claim 24.

32. An electrode coated with a chromophorically useful layer of a polymer of claim 26.

33. An electrode coated with a chromophorically useful layer of a polymer of claim 30.

34. In an electronic display device comprising at least one solid chromophore on an electrode, the improvement comprising employing as said electrode that of claim 31.

35. In an electronic display device comprising at least one solid chromophore on an electrode, the improvement comprising employing as said electrode that of claim 32.

36. In an electronic display device comprising at least one solid chromophore on an electrode, the improvement comprising employing as said electrode that of claim 33.

37. An electrode as in claim 31 in which said layer is about 1 to 5 microns thick.

38. An electrode as in claim 37 which is tin oxide.

* * * * *

UNITED STATES PATENT AND TRADEMARK OFFICE
CERTIFICATE OF CORRECTION

PATENT NO. : 4,611,890

DATED : September 16, 1986

INVENTOR(S) : Cecil M. Elliott, et al

It is certified that error appears in the above-identified patent and that said Letters Patent is hereby corrected as shown below:

Column 4, line 15, "$SO_4^-$, $CO_3^-$" should read -- $SO_4^=$, $CO_3^=$ --.

Column 13, line 1, "compound" should read -- compounds --.

Column 14, line 1, "2" should read -- 3 --.

Column 16, line 14, "is" should read -- and --.

Signed and Sealed this

Twenty-seventh Day of October, 1987

Attest:

DONALD J. QUIGG

*Attesting Officer*  *Commissioner of Patents and Trademarks*

UNITED STATES PATENT AND TRADEMARK OFFICE
CERTIFICATE OF CORRECTION

PATENT NO. : 4,611,890

DATED : September 16, 1986

INVENTOR(S) : Cecil M. Elliott, et al.

Page 1 of 2

It is certified that error appears in the above-identified patent and that said Letters Patent is hereby corrected as shown below:

IN THE SPECIFICATION

Column 9, line 14, the terminal portion of the structure should read -- $-\underset{\underset{O}{\|}}{C}-CH=CH_2$ --.

Column 9, line 54, ".2Cl$^-$" should read -- ·2Cl$^-$ --.

Column 10, line 19, ".2PF$_6$" should read -- ·2PF$_6^-$ --.

IN THE CLAIMS

Column 13, line 45, the structure should read

-- $-\underset{\|}{\overset{O}{C}}-Y-R-Y'-\underset{\|}{\overset{O}{C}}-\underset{\|}{\overset{R_i}{C}}=CH_2$ --.

Column 14, line 59, the structure should read

-- $-\underset{\|}{\overset{O}{C}}-Y-R-Y'-\underset{\|}{\overset{O}{C}}-\underset{\|}{\overset{R_i}{C}}=CH_2$ --.

UNITED STATES PATENT AND TRADEMARK OFFICE
CERTIFICATE OF CORRECTION

PATENT NO. : 4,611,890
DATED : September 16, 1986
INVENTOR(S) : Cecil M. Elliott, et al It is certified that error appears in the above-identified patent and that said Letters Patent is hereby corrected as shown below:

Column 16, line 19, the structure should read

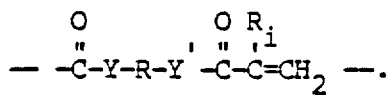

Signed and Sealed this

Tenth Day of May, 1988

Attest:

DONALD J. QUIGG

Attesting Officer

Commissioner of Patents and Trademarks